US00RE46053E

(19) United States
(12) Reissued Patent
Wu

(10) Patent Number: US RE46,053 E
(45) Date of Reissued Patent: Jul. 5, 2016

(54) AIR VALVE CONNECTOR FOR CONNECTING DIFFERENT VALVES

(71) Applicant: Scott Wu, Taichung (TW)

(72) Inventor: Scott Wu, Taichung (TW)

(21) Appl. No.: 14/801,934

(22) Filed: Jul. 17, 2015

Related U.S. Patent Documents

Reissue of:

(64) Patent No.: 8,720,475
Issued: May 13, 2014
Appl. No.: 13/461,958
Filed: May 2, 2012

(30) Foreign Application Priority Data

Feb. 15, 2012 (TW) ..... 101104914 A

(51) Int. Cl.
*F16K 15/20* (2006.01)
*F04B 33/00* (2006.01)

(52) U.S. Cl.
CPC ..... *F04B 33/00* (2013.01); *F04B 33/005* (2013.01); *Y10T 137/3584* (2015.04); *Y10T 137/3724* (2015.04); *Y10T 137/5109* (2015.04); *Y10T 137/5283* (2015.04)

(58) Field of Classification Search
CPC . F04B 33/00; F04B 33/005; Y10T 137/5283; Y10T 137/3724; Y10T 137/5109; Y10T 137/3584
See application file for complete search history.

(56) References Cited

U.S. PATENT DOCUMENTS 5,645,100 A * 7/1997 Chuang et al. ..... F04B 33/005 137/223
5,666,990 A * 9/1997 Wu ..... B60S 5/04 137/223
5,683,234 A * 11/1997 Chuang et al. ..... F04B 33/005 137/223
5,762,095 A * 6/1998 Gapinski et al. ..... B60S 5/04 137/223
6,276,405 B1 * 8/2001 Wang ..... F04B 33/005 141/38
6,289,920 B1 * 9/2001 Wang ..... B60S 5/04 137/223
6,328,057 B1 * 12/2001 Wang ..... F16L 37/18 137/223
8,328,538 B2 * 12/2012 Smits ..... F04B 37/14 417/415
8,360,090 B2 * 1/2013 Wang ..... F16K 11/056 137/119.06
2011/0155260 A1 6/2011 Huang

FOREIGN PATENT DOCUMENTS

DE 102010017538 B3 1/2012

* cited by examiner

*Primary Examiner* — Joseph Kaufman
(74) *Attorney, Agent, or Firm* — Alan D. Kamrath; Kamrath IP Lawfirm, P.A.

(57) ABSTRACT

An air valve connector is threadly engaged to a nozzle head of an air pump, which is eccentrically and pivotally connected with a cam lever. The cam lever is adapted to press against a plug and an airtight ring disposed in the nozzle head to compel the valve connector to connect with different types of air valves such as a French type valve, a German type valve, an English type valve, and an American type valve. The air valve connector is reversed easily between first and second positions to be adapted to connect with the different type valves by the user.

12 Claims, 15 Drawing Sheets

AIR VALVE CONNECTOR FOR CONNECTING DIFFERENT VALVES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates to an air valve connector for an air pump that can be used with valves of various types.

2. Description of the Related Art

FIGS. 13 through 15 show a nozzle head of an air pump for selectively connecting with an American type valve and a French type valve. The nozzle head includes a case 91 adapted for connecting an air pump, in which a plug 92, a connector 93, and a stopper 94 are provided. An end of the case 91 is threadly engaged with a cap 95, and the other end of the case 91 is pivotally connected with a cam lever 96. The cap 95 and the cam lever 96 can avoid the plug 92, the connector 93, and the stopper 94 disengaged from the case 91. The connector 93 and the stopper 94 abut against each other for connecting with different types of valves.

When the nozzle head is used to connect with different types of valves, the user must unscrew the cap 95 and remove the connector 93 and the stopper 94 from the case 91 in sequence. Moreover, the user has to reverse the connector 93 and the stopper 94 respectively and screw the cap 95 from the case 91 again for connecting with the desired type valve.

However, problems with the nozzle head are troublesome detachments, assembling sequential errors, and the elements, such as the connector 93, the stopper 94, and the cap 95, easily getting lost when detached.

The present invention is, therefore, intended to obviate or at least alleviate the problems encountered in the prior art.

SUMMARY OF THE INVENTION

According to the present invention, the main purpose is to provide an air valve connector threadly engaged to a nozzle head of an air pump, which is eccentrically and pivotally connected with a cam lever. The cam lever is adapted to press against a plug and an airtight ring disposed in the nozzle head to compel the valve connector to connect with different types of air valves such as a French type valve, a German type valve, a English type valve, and an American type valve. The air valve connector of the present invention is reversed easily between first and second positions to be adapted to connect with the different type valves by the user.

It is an object of the present invention to provide the air valve connector for an air pump that can be used with valves of various types.

It is another object of the present invention that the air valve connector is alternatively located between the first and second positions to prevent troublesome detachments, assembling errors, and the elements easily getting lost when detached.

BRIEF DESCRIPTION OF THE DRAWINGS

The illustrative embodiment may best be described by reference to the accompanying drawings where.

Figure 1:
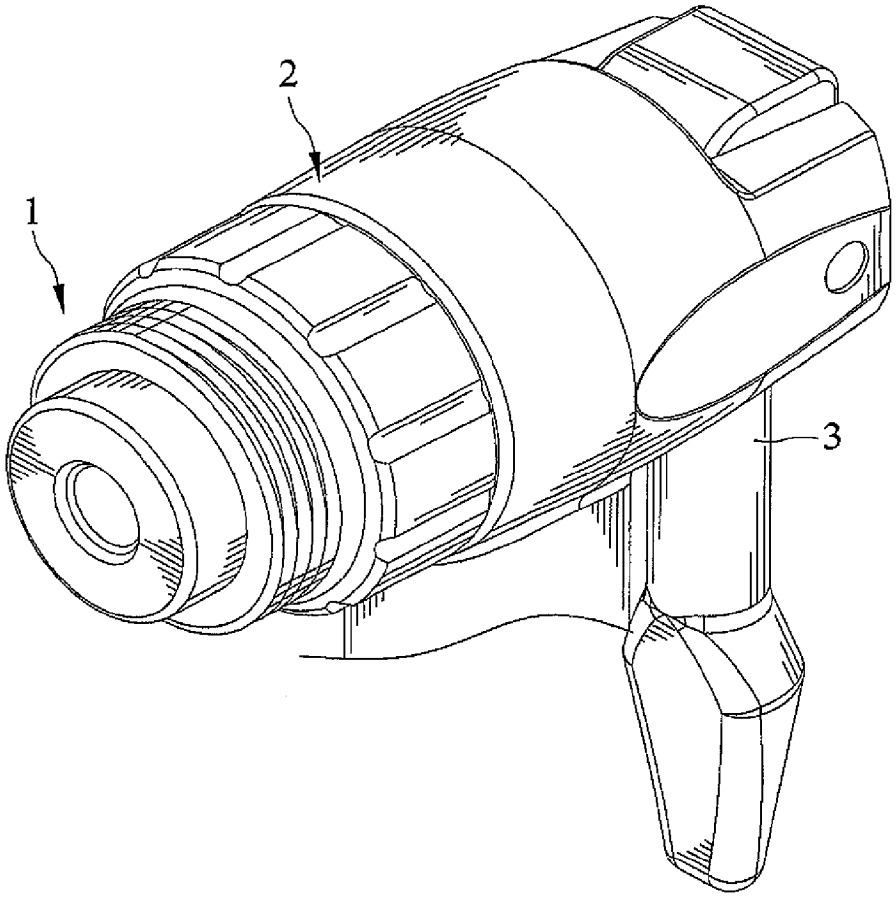
FIG. 1 is a perspective view of an air valve connector for an air pump in accordance with a first embodiment of the present invention engagable with a nozzle head of an air pump.

All Figures are drawn for ease of explanation of the basic teachings of the present invention only; the extensions of the Figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various Figures of the drawings, the same numerals designate the same or similar parts. Furthermore, when the terms "first", "second", "third", "inner", "outer", "side", "end", "portion", "section", "longitudinal", "clockwise", "counterclockwise", and similar terms are used herein, it should be understood that these terms have reference only to the structure shown in the drawings as it would appear to a person viewing the drawings and are utilized only to facilitate describing the invention.

DETAILED DESCRIPTION OF THE PREFERRED EMBODIMENTS

Figure 2:
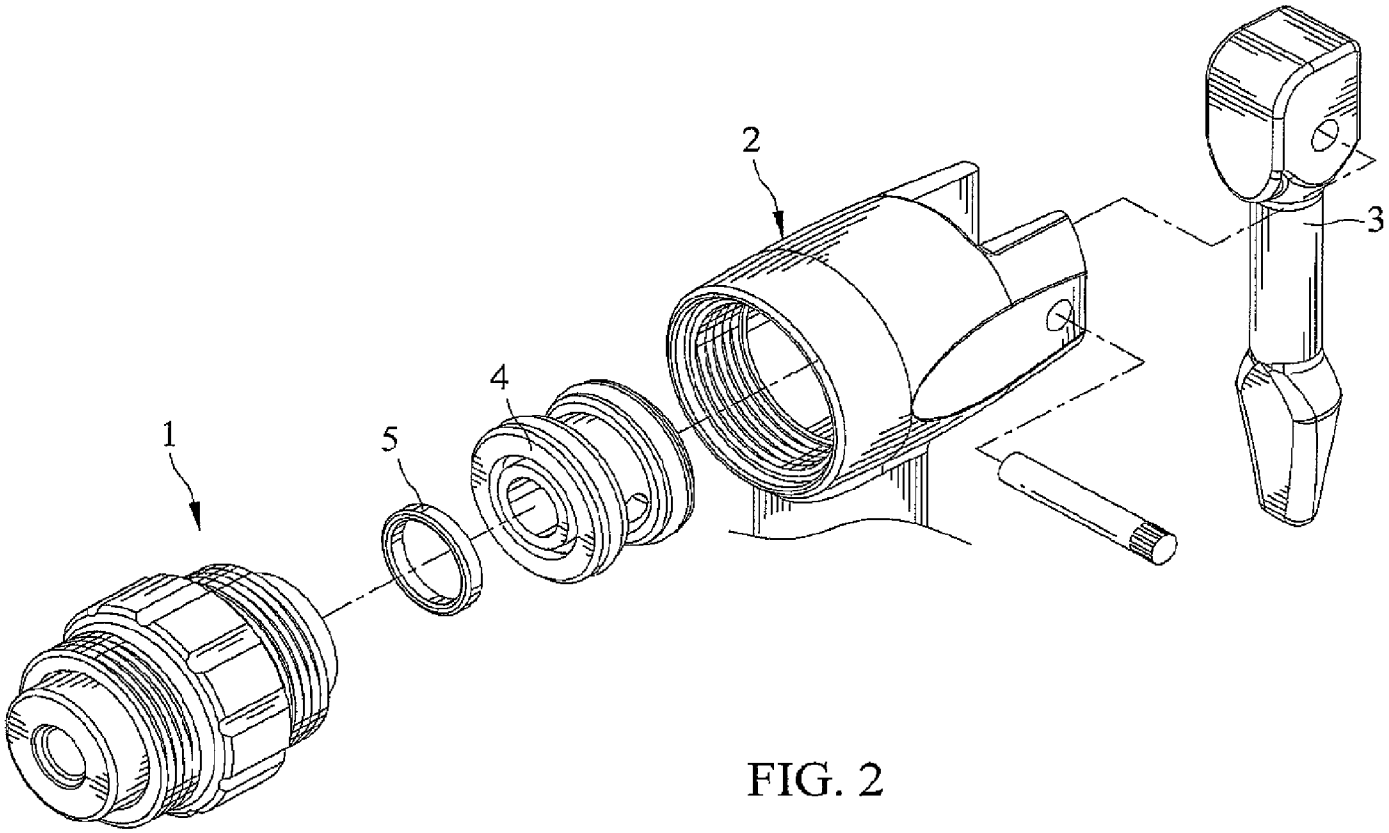
FIG. 2 is an exploded perspective view of the air valve connector of FIG. 1.
Figure 3:
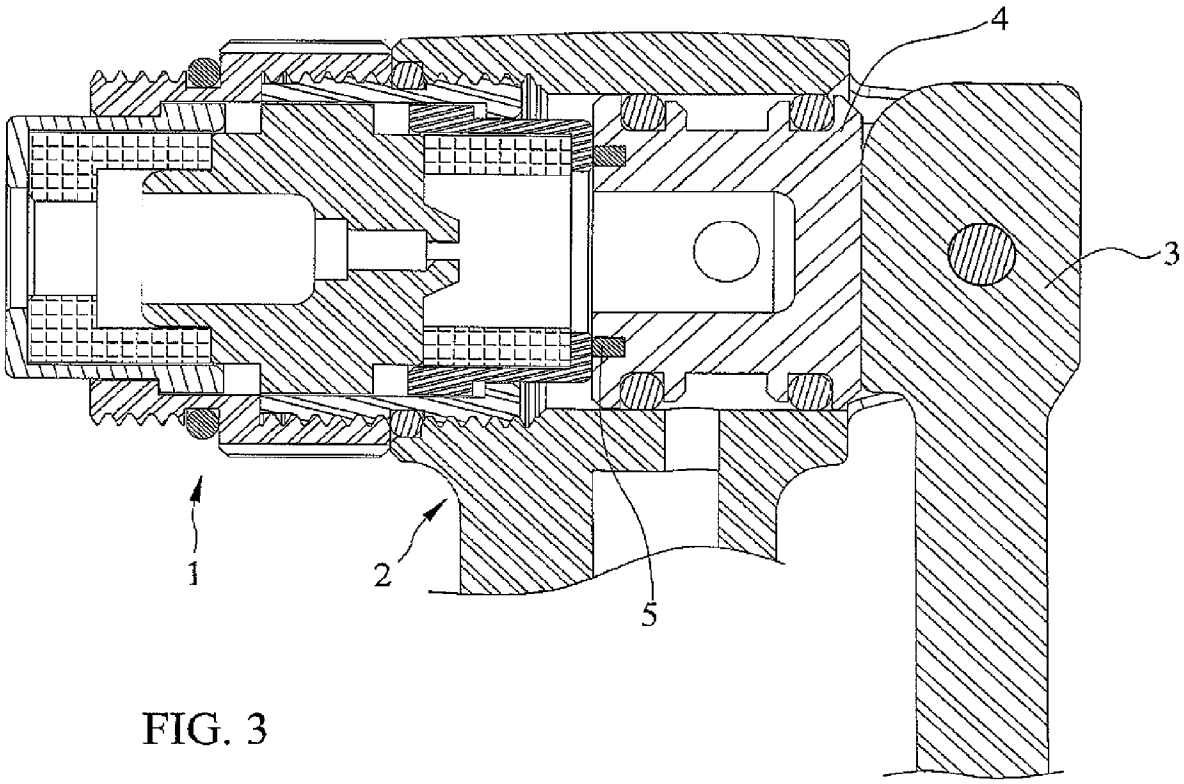
FIG. 3 is a cross-sectional view of the air valve connector of FIG. 1.
Figure 4:
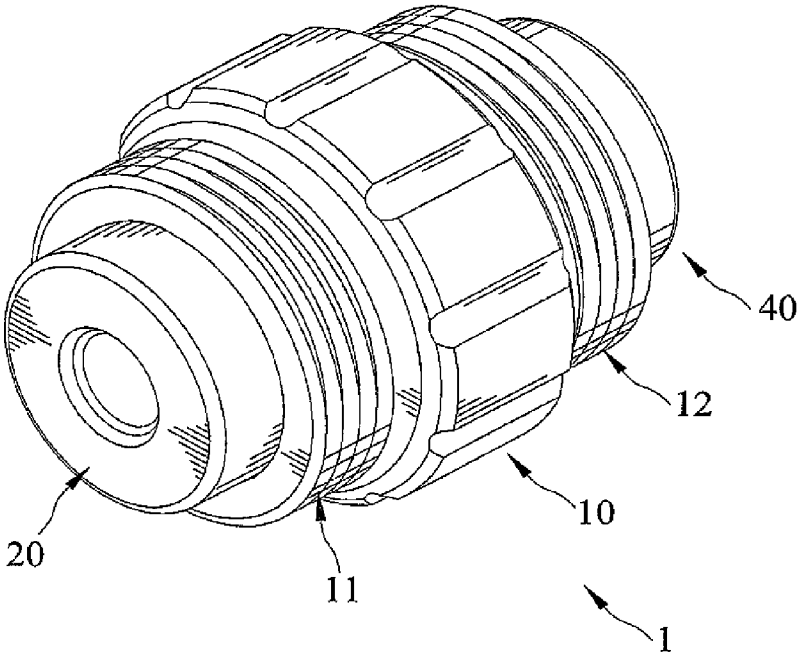
FIG. 4 is a perspective view of an air valve connector for an air pump in accordance with the first embodiment of the present invention.
Figure 5:
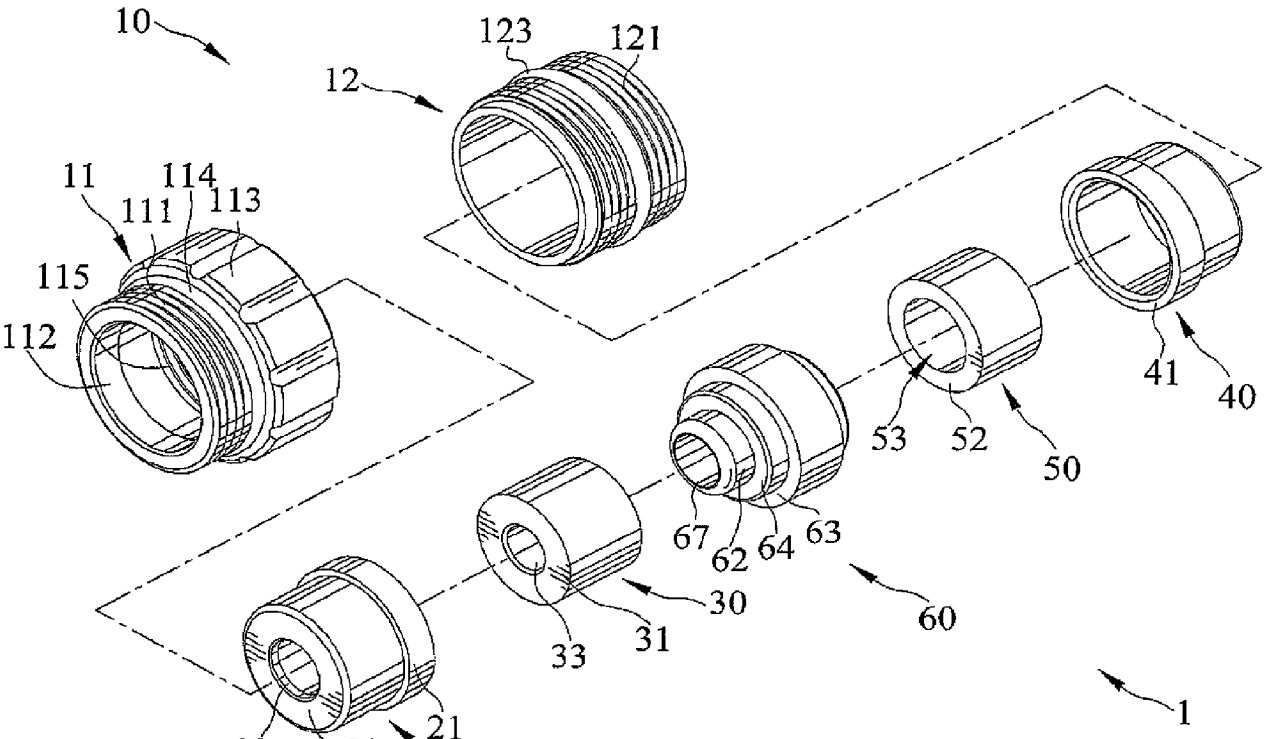
FIG. 5 is an exploded perspective view of the air valve connector of FIG. 4.
Figure 6:
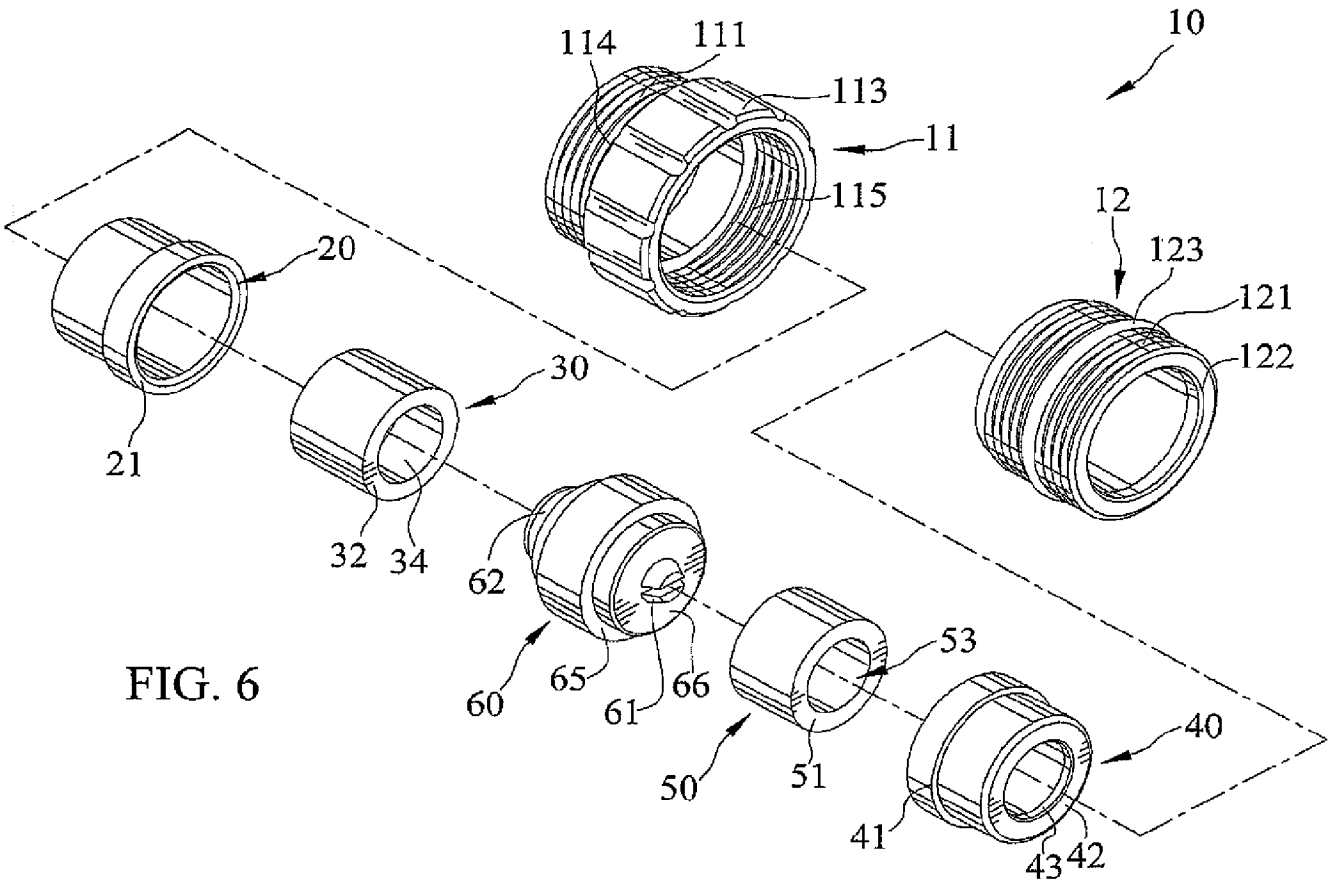
FIG. 6 is another exploded perspective view of the air valve connector of FIG. 4.
Figure 7:
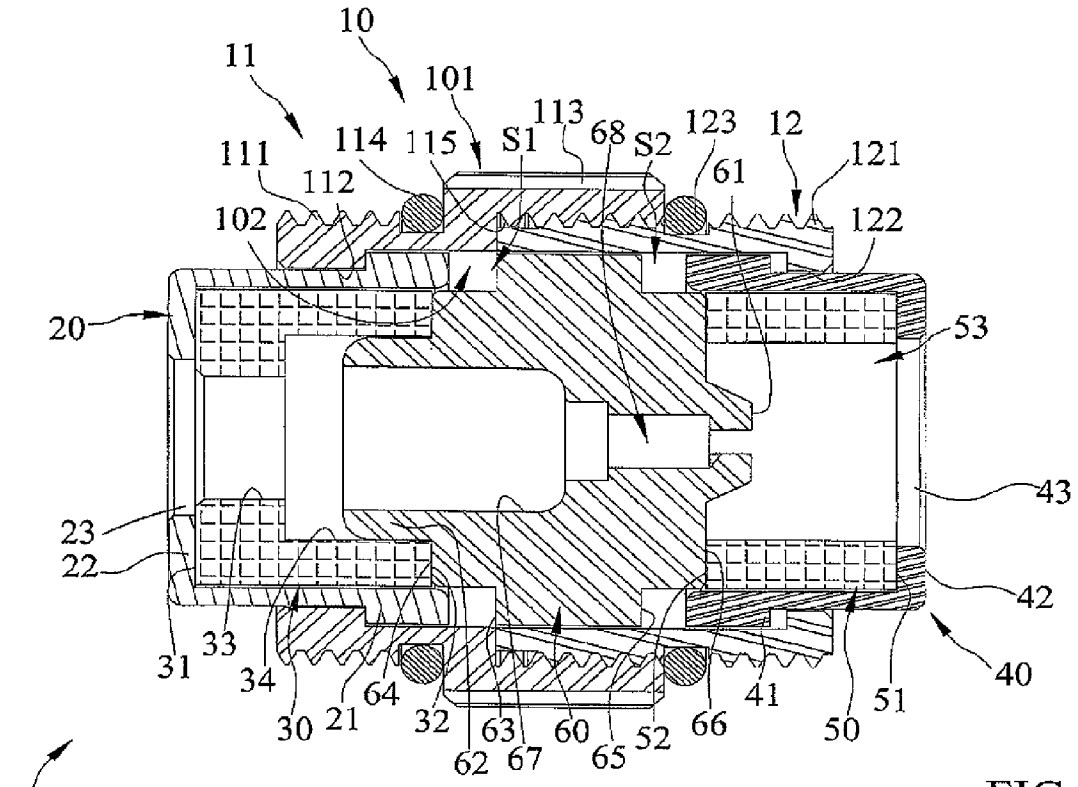
FIG. 7 is a cross-sectional view of the air valve connector of FIG. 4.

Referring to FIGS. 1 through 3, an air valve connector 1 in accordance with the present invention is threadly engaged to a nozzle head 2 of an air pump having a cam lever 3. The cam lever 3 is eccentrically and pivotally connected to the nozzle head 2 and adapted to press against a plug 4 and an airtight ring 5 disposed in the nozzle head 2 to compel the air valve connector 1 to connect with different types of air valves such as a French type valve, a German type valve, a English type valve, and an American type valve. The air valve connector 1 of the present invention is reversed easily between first and second positions to be adapted to connect with the different type valves by the user and engaged to the nozzle head 2 of the air pump.

Referring to FIGS. 4 through 7, the air valve connector 1 in accordance with a first embodiment of the present invention includes a housing assembly 10 engagable with the nozzle head 2 of the air pump, a first cap 20 received in and slidable axially with respect to the housing assembly 10, a first seal 30 received in the first cap 20, a second cap 40 arranged opposite to the first cap 20 and received in and slidable axially with respect to the housing assembly 10, a second seal 50 received in the second cap 40, and a core member 60 received in the housing assembly 10 and disposed between the first and second seals 30 and 50 therein.

The housing assembly 10 includes outer and inner peripheries 101 and 102. The outer periphery 101 includes first and second outer thread portions 111 and 121 respectively arranged at two opposite ends thereof and alternatively engaged with the nozzle head 2 of the air pump (as shown in FIG. 1). The inner periphery 102 includes first and second restricting portions 112 and 122 extended radially therefrom to a radial extent. Further, the housing assembly 10 includes first and second sleeves 11 and 12 threadly engaged with each other. Further, the first sleeve 11 includes the first outer thread portion 111, a first restricting portion 112, a holding portion 113, a first airtight member 114, and a connecting portion 115 therein. The first outer thread portion 111, the holding portion 113, and the first airtight member 114 are disposed at an outer surface of the first sleeve 11. The holding portion 113 is extended circumferentially from the outer surface of the first sleeve 11 to a circumferential extent and includes a plurality of slots to prevent slipping while the user grips there. The first restricting portion 112 and the connecting portion 115 are disposed at an inner surface of the first sleeve 11. Furthermore, the second sleeve 12 includes the second outer thread portion 121, a second restricting portion 122, and a second airtight member 123 therein. The second outer thread portion 121 and the second airtight member 123 are disposed at an outer surface of the second sleeve 12. The second airtight member 123 is mounted on an outer periphery of the second outer thread portion 121. The second outer thread portion 121 is engaged with the connecting portion 115 so that the second airtight member 123 is abutted against an end face of the holding portion 113 opposite to the first airtight member 114.

The first cap 20 is selectively received in the housing assembly 10. In this embodiment, the first cap 20 is received in the housing assembly 10 and includes a first flange 21, a first face portion 22, and a first hole 23. The first flange 21 is abutted against the first restricting portion 112, and is able to be pressed to move with respect to the inner periphery 102, so that the first flange 21 is slidable with respect to an inner wall of the first sleeve 11.

The first seal 30 is made of soft materials and includes first and second ends 31 and 32 respectively disposed at two opposite ends thereof, a first through hole 33 communicated with the first end 31, and a chamber 34 disposed between and communicated with the first through hole 33 and the second end 32. The first seal 30 is received in the first cap 20, and the first end 31 is abutted against the first face portion 22.

The second cap 40 is selectively received in the housing assembly 10. In this embodiment, the second cap 40 is received in the housing assembly 10 and includes a second flange 41, a second face portion 42, and a second hole 43. The second flange 41 is able to be abutted against the second restricting portion 122, and is able to be pressed to move with respect to the inner periphery 102, so that the second flange 41 is slidable with respect to an inner wall of the second sleeve 12.

The second seal 50 is made of soft materials and includes first and second ends 51 and 52 respectively disposed at two opposite ends thereof, a second through hole 53 extended between the first and second ends 51 and 52. The second seal 50 is received in the second cap 40, and first end 51 of the second seal 50 is abutted against the second face portion 42.

The core member 60 is made of soft materials and includes a guiding portion 61 and a projecting portion 62 extending axially from two opposite ends thereof. The projecting portion 62 is a stepped shape to form a first resisting face 63 disposed between there and an end surface of the core member 60, and a first shoulder 64 extending axially from the first resisting face 63. The guiding portion 61 extends axially from a second resisting face 65 arranged opposite to the first resisting face 63. A second shoulder 66 is formed between the guiding portion 61 and the second resisting face 65. The core member 60 further includes an aperture 67 connected to the projecting portion 62, and a stepped hole 68 communicated with the aperture 67 and connected to the guiding portion 61 therethrough. The first resisting face 63 faces the first flange 21 to define a first space S1. The second resisting face 65 faces the second flange 41 to define a second space S2.

Figure 8:
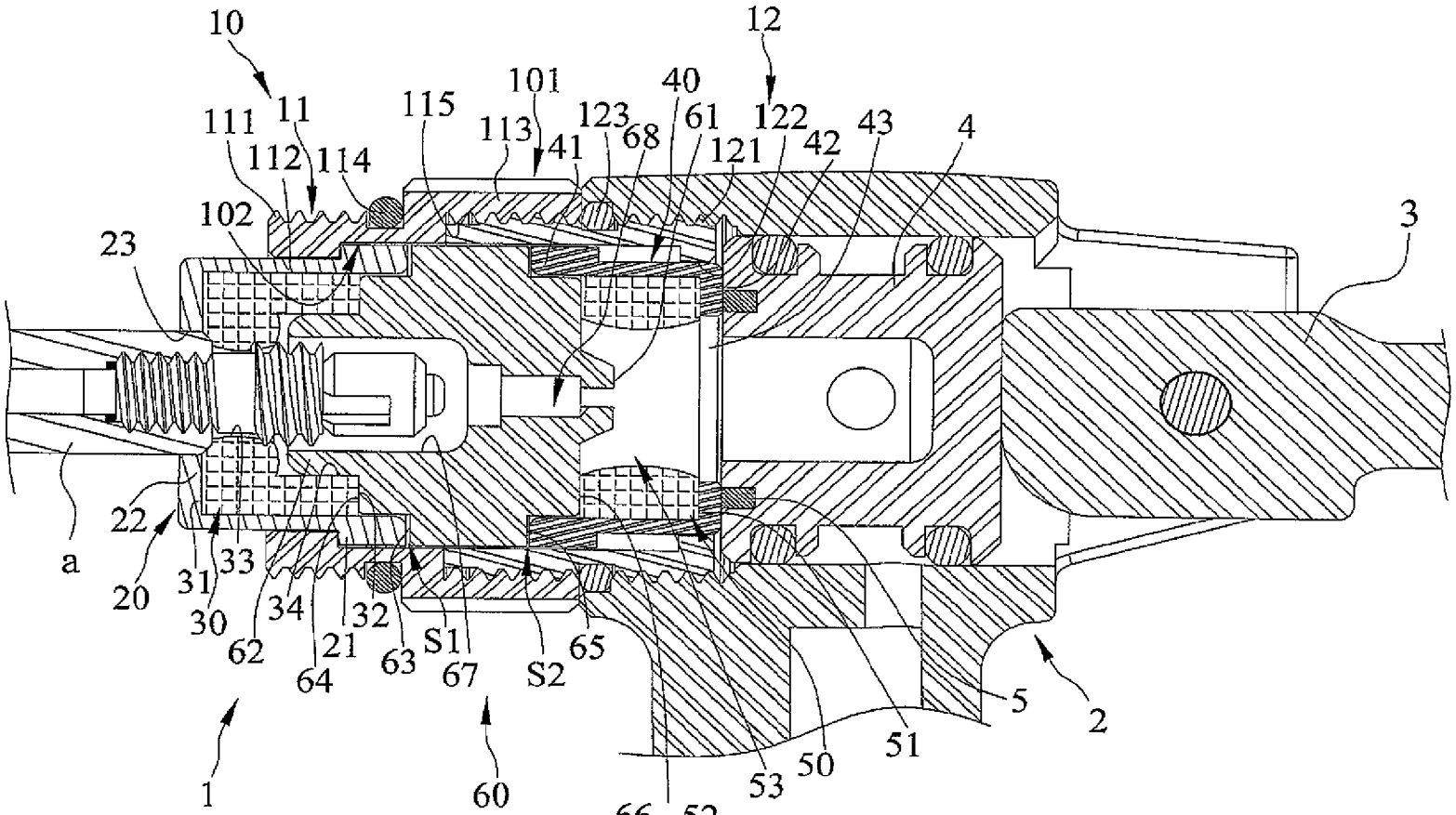
FIG. 8 is a cross-sectional view of the air valve connector of FIG. 4 illustrating the air valve connector connecting with a French type valve.

FIG. 8 shows the air valve connector 1 connecting with a French type valve. When the air valve connector 1 is located in a first position, the second outer thread portion 121 of the second sleeve 12 is engaged with the nozzle head 2 of the air pump. Thus, the end face of the holding portion 113 abutted with the second airtight member 123 is abutted against an end face of the nozzle head 2. The first sleeve 11 is exposed out the nozzle head 2, and the second sleeve 12 is received in the nozzle head 2.

The user presses the cam lever 3 to pivot with respect to the nozzle head 2 and to press against the plug 4 to make a forced tight relation between the nozzle head 2 and the plug 4, such that the plug 4 pushes the second face portion 42 of the second cap 40 to move with respect the inner periphery 102 of the housing assembly 10. The second flange 41 is detached from the second restricting portion 122 and abutted against the second resisting face 65, and the second face portion 42 presses against the second seal 50. The second end 52 of the second seal 50 is abutted against the second shoulder 66.

The core member 60 is oppressed from the second seal 50 to cause the first resisting face 63 to move close and face the first flange 21. The first shoulder 64 is abutted against the second 32 of the first seal 30, and the first end 31 of the first seal 30 is abutted against the first face portion 22 to cause the first flange 21 to abut against the first restricting portion 112.

A French type valve a is inserted through the first hole 23 of the first cap 20 and the first through hole 33 of the first seal 30, and the first seal 30 is adapted for air-tightly surrounding and non-threadly engaging with a neck of the French type valve a. Air pumped from the air pump is able to flow through the second hole 43, the second through hole 53, the stepped hole 68, and the aperture 67 into the French type valve a. The second airtight member 123 provides that air cannot leak between the nozzle head 2 and the housing assembly 10. The airtight ring 5 provides that air cannot leak between the plug 4 and the second cap 40. Moreover, the air valve connector 1 located in a first position is adapted for connecting with a German type valve or an English type valve.

Figure 9:
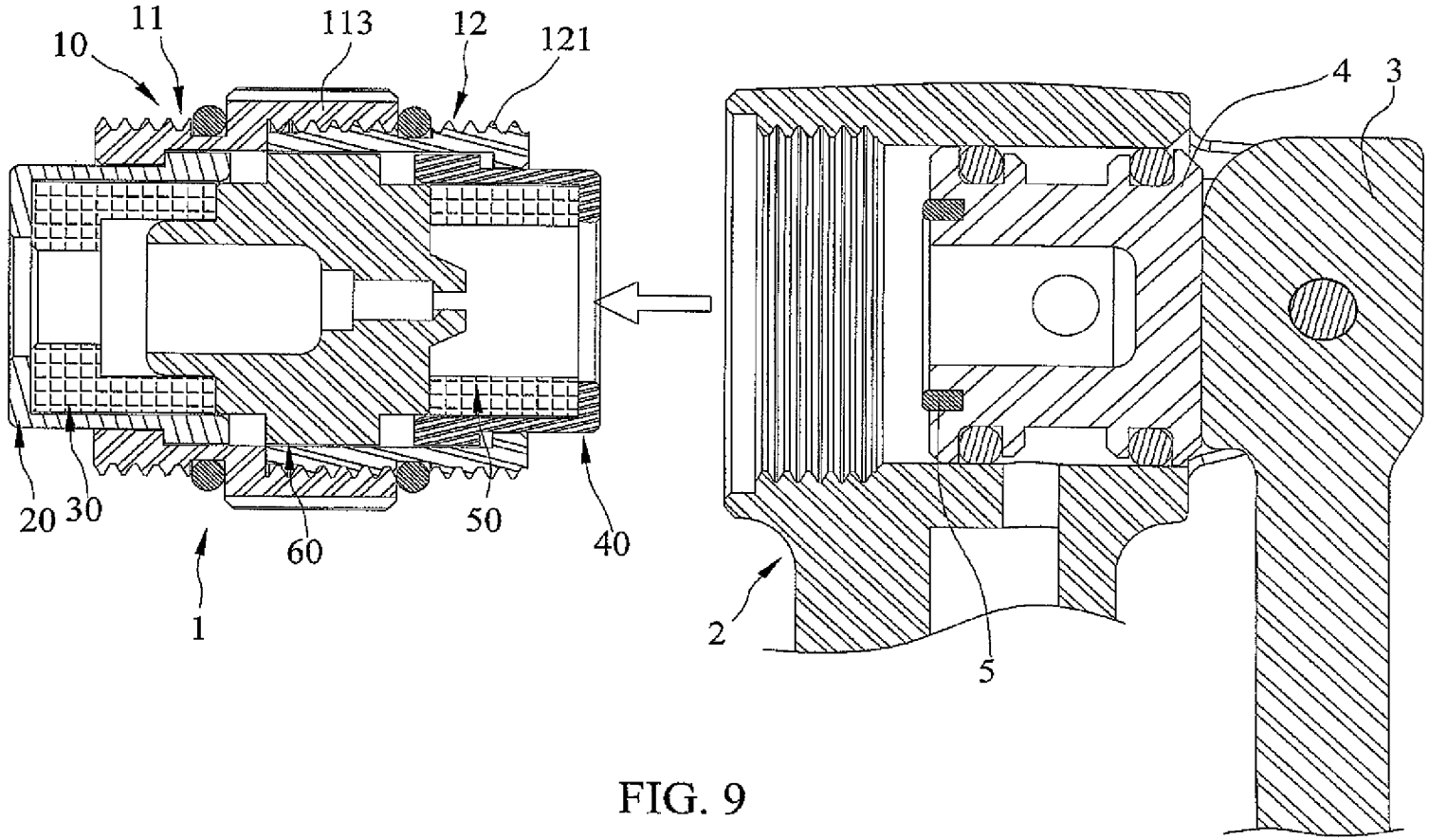
FIG. 9 is a cross-sectional view of the air valve connector of FIG. 4 illustrating the air valve connector detached from the nozzle head of the air pump.
Figure 10:
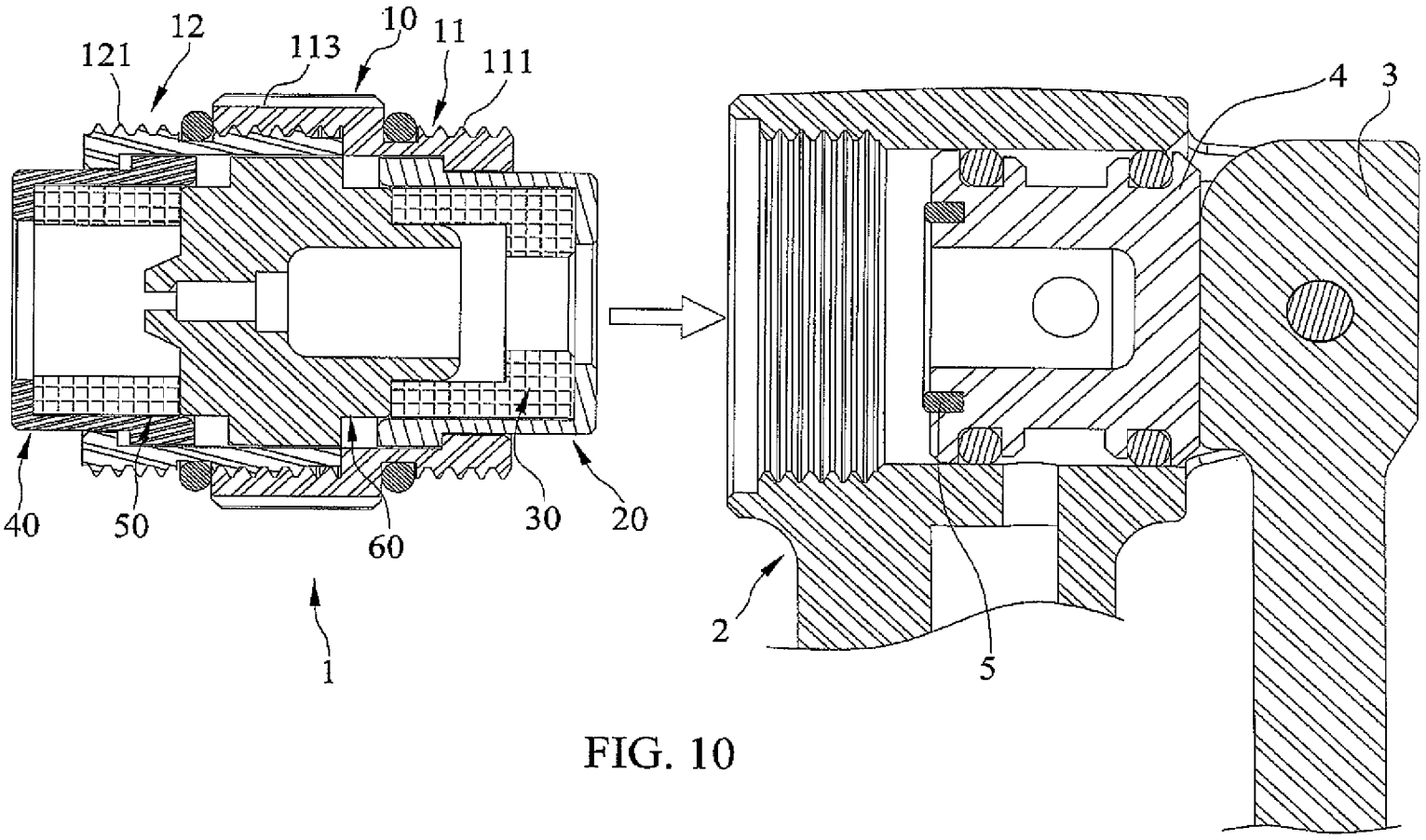
FIG. 10 is a cross-sectional view of the air valve connector of FIG. 9 illustrating the air valve connector reversed from a first position to a second position.

FIGS. 9 and 10 show the cam lever 3 pivoted with respect to the nozzle head to remove the forced tight relation between the nozzle head 2 and the plug 4. The user can grip and rotate the holding portion 113 to cause the second outer thread portion 121 to be disengaged from the nozzle head 2 of the air pump. The air valve connector 1 disengaged from the nozzle head 2 can be reversed, and the first outer thread portion 111 is engageable with the nozzle head 2. Thus, the air valve connector 1 is located from the first position to the second position to prevent problems such as troublesome detachments, assembling errors, and the elements easily getting lost when detached.

Figure 11:
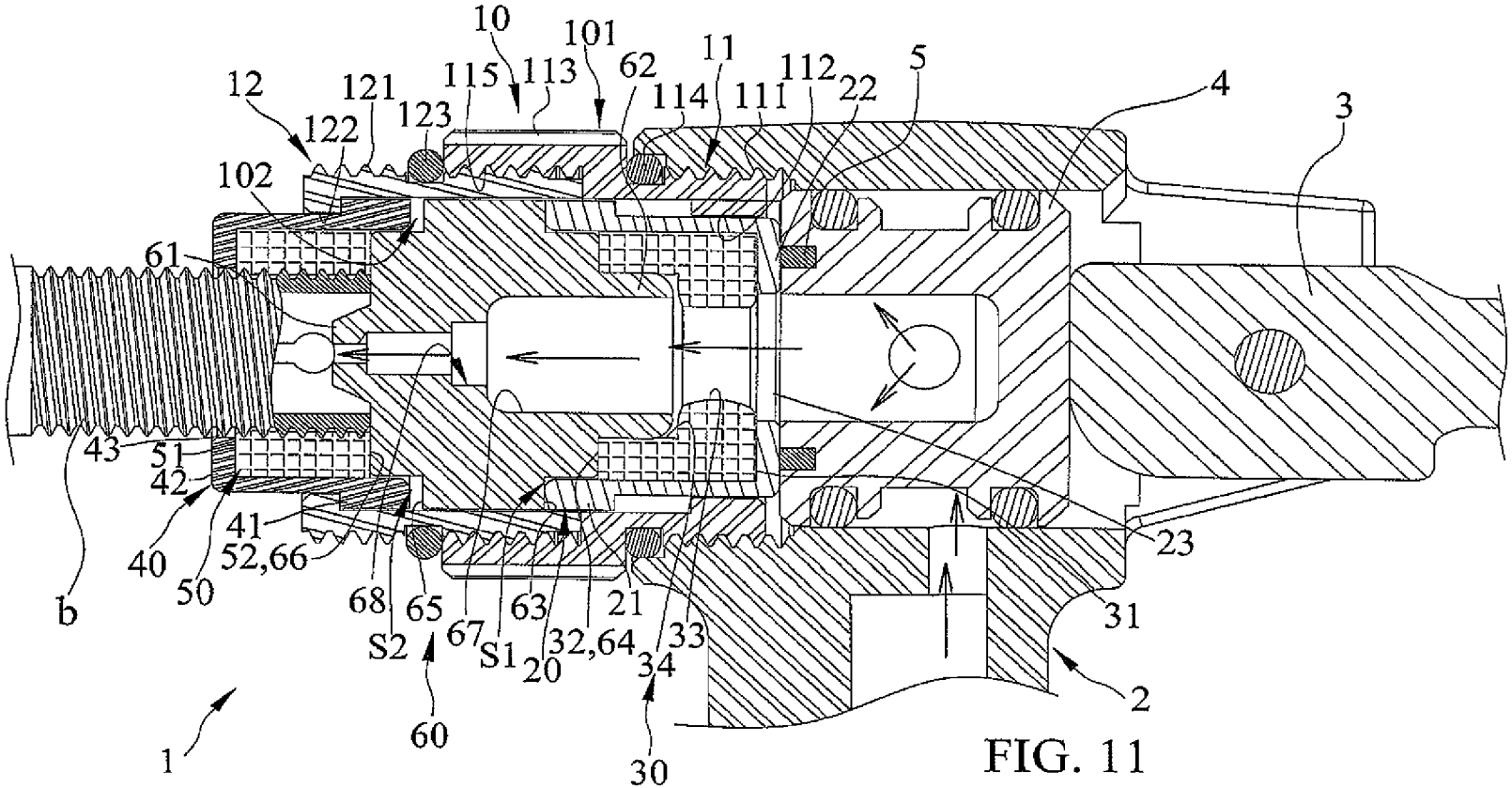
FIG. 11 is a cross-sectional view of the air valve connector of FIG. 10 illustrating the air valve connector connecting with an American type valve.

FIG. 11 shows the air valve connector 1 connecting with an American type valve. The first outer thread portion 111 is engaged with the nozzle head 2. An end face of the holding portion 113 opposite to the second airtight member 123 faces the nozzle head 2. The second sleeve 12 is exposed out the nozzle head 2, the first sleeve 11 is received in the nozzle head 2, and the air valve connector 1 is located in the second position.

The user presses the cam lever 3 to pivot with respect to the nozzle head 2 and to press against the plug 4, such that the plug 4 pushes the first face portion 22 of the first cap 20 to move with respect the inner periphery 102 of the housing assembly 10. The first flange 21 is detached from the first restricting portion 112, and the first face portion 22 presses against the first seal 30. The second end 32 of the first seal 30 is abutted against the first resisting face 63. The projecting portion 62 is surrounded and received in the chamber 34 tightly. The core member 60 is pressed by the second seal 50, so that the second resisting face 65 is moving close and facing the second flange 41. The second shoulder 66 presses against the second end 52 of the second seal 50, and the first end 51 of the second seal 50 presses against the second face portion 42 of the second cap 40, such that the second flange 41 is abutted against the second restricting portion 122.

An American valve b is inserted through the second hole 43 of the second cap 40 and the second through hole 53 of the second seal 50. The American valve b is abutted against guiding portion 61, and the second seal 50 is adapted for air-tightly surrounding and non-threadly engaging with a neck of the American valve b. Air pumped from the air pump is able to flow through the plug 4, the first hole 23, the first through hole 33, the aperture 67, and the stepped hole 68 into the American valve b.

Figure 12:
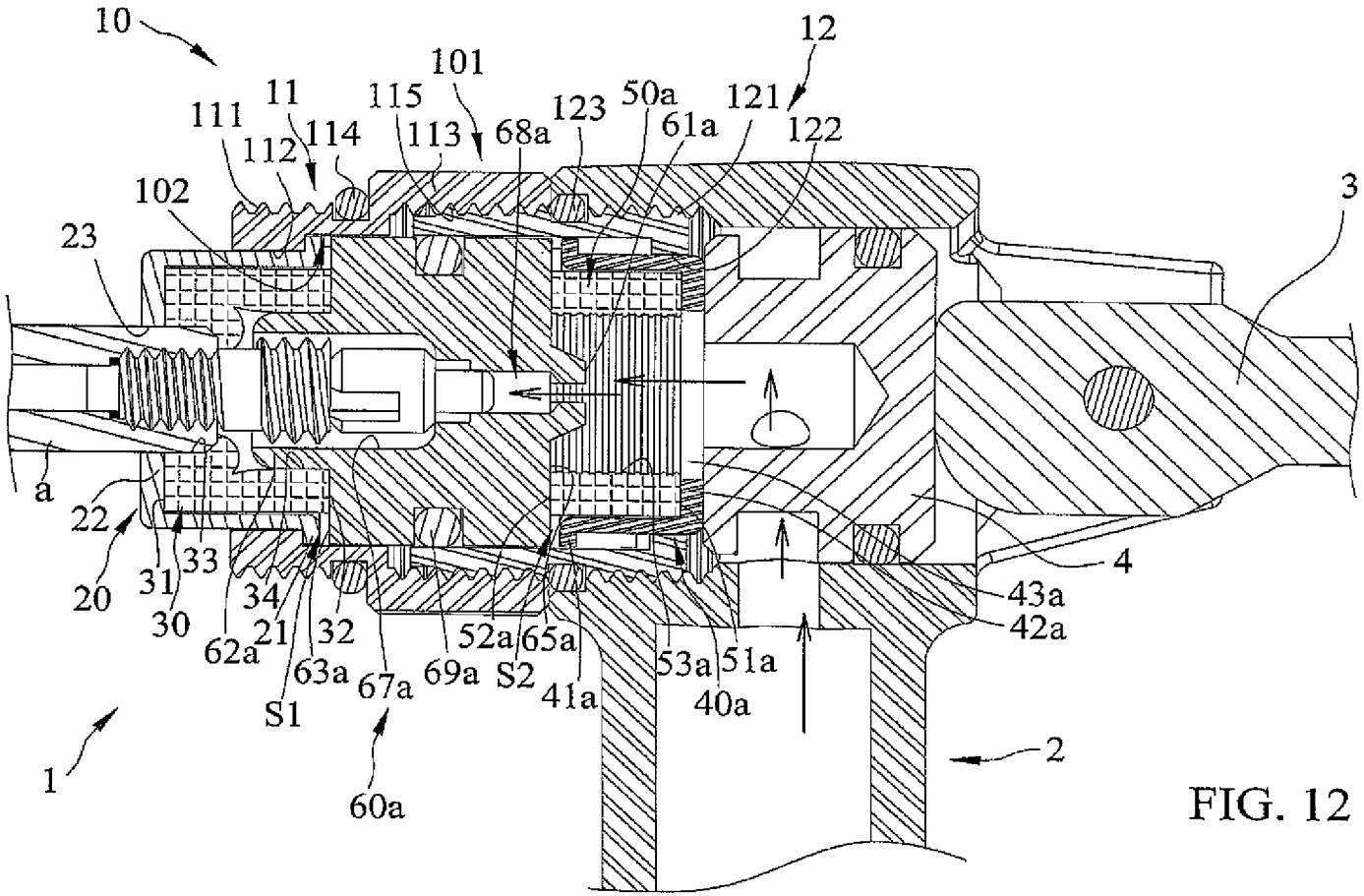
FIG. 12 is a cross-sectional view of the air valve connector for an air pump in accordance with a second embodiment of the present invention.
Figure 13:
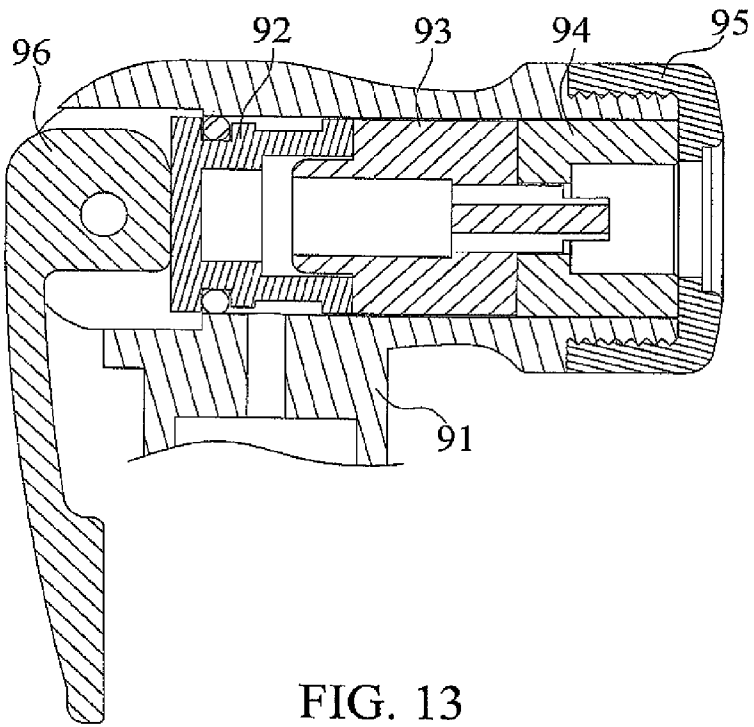
FIG. 13 PRIOR ART
FIG. 13 is a perspective view of a convention nozzle head of an air pump for selectively connecting an American type valve and a French type valve.
Figure 14:
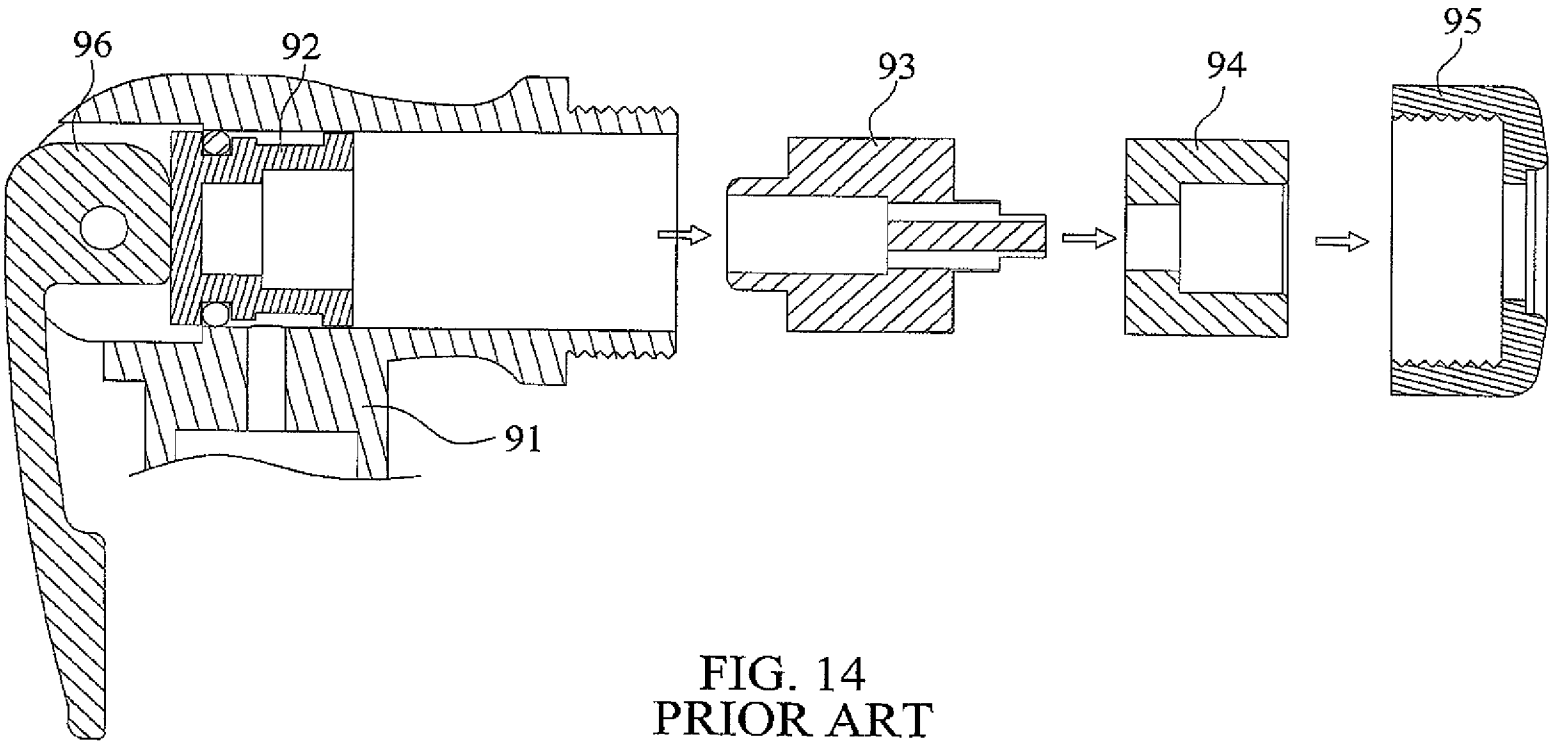
FIG. 14 PRIOR ART
FIG. 14 is an exploded perspective view of the convention nozzle head of FIG. 13.
Figure 15:
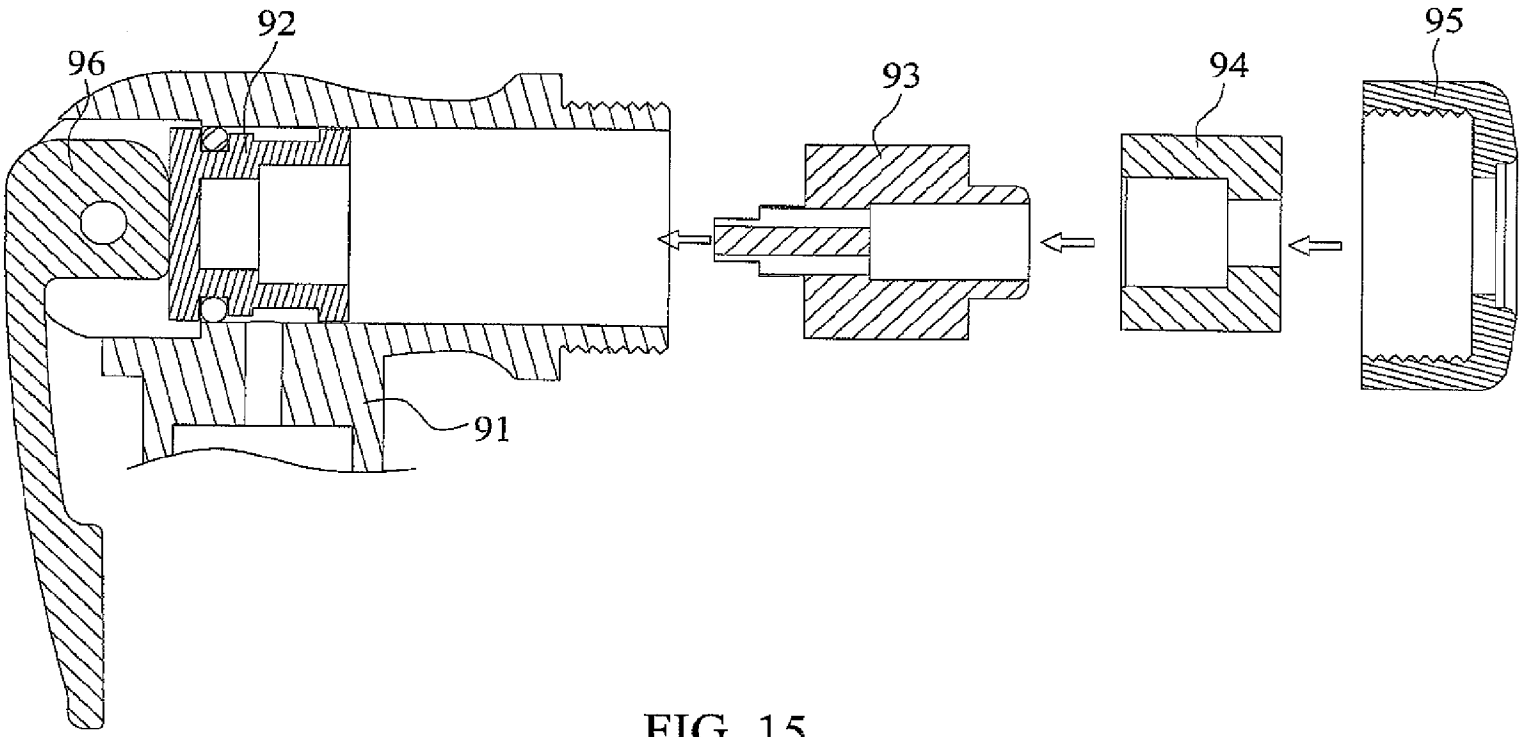
FIG. 15 PRIOR ART
FIG. 15 is another exploded perspective view of the convention nozzle head of FIG. 13.

FIG. 12 shows an air valve connector 1 in accordance with a second embodiment of the present invention. The second embodiment differentiates from the first embodiment in that it includes a second cap 40a, a second seal 50a, and core member 60a.

The second cap 40a includes a second flange 41a, a second face portion 42a, and a second hole 43a. A thickness defined in the second flange 41a is smaller than a thickness defined in the second flange 41 in the first embodiment.

The second seal 50a includes first and second ends 51a and 52a respectively disposed at two opposite ends thereof, and a second through hole 53a extended between the first and second ends 51a and 52a. The second through hole 53a is a screw hole adapted to threadly engage with the American type valve b.

The core member 60a is made of soft materials and includes a guiding portion 61a and a projecting portion 62a extending axially from two opposite ends thereof. A first resisting face 63a is formed between the projecting portion 62a and an end surface of the core member 60a. A second resisting face 65a is formed between the guiding portion 61a and an end surface of the core member 60a opposite to the projecting portion 62a.

The core member 60a further include an aperture 67a connected to the projecting portion 62a, and a stepped hole 68a communicated with the aperture 67a and connected to the guiding portion 61a therethrough. A airtight ring 69a arranged at an outer second resisting face 65a to provide the function of air tightness between the core member 60a and the housing assembly 10.

The first flange 21 of the first cap 20 and the second end 32 of the first seal 30 face the first resisting face 63a of the core member 60a to define the first space S1, and the second flange 41a of the second cap 40a and the second end 52a of the second seal 50a face the second resisting face 65a of the core member 60a to define the second space S2.

The second outer thread portion 121 of the second sleeve 12 is engaged with the nozzle head 2 of the air pump, such that the end face of the holding portion 113 is abutted against the end face of the nozzle head 2, the first sleeve 11 is exposed out the nozzle head 2, and the second sleeve 12 is received in the nozzle head 2.

The user presses the cam lever 3 to pivot with respect to the nozzle head 2 and to press against the plug 4, such that the plug 4 pushes the second face portion 42a of the second cap 40a to move with respect the inner periphery 102 of the housing assembly 10. The second flange 41a is detached from the second restricting portion 122 and moves toward the second resisting face 65a, and the second face portion 42a presses against the second seal 50a. The second end 52a of the second seal 50a is abutted against the second resisting face 65a.

The core member 60a is oppressed from the second seal 50a to cause the first resisting face 63a to move close and face the first flange 21, and to abut against the second end 32 of the first seal 30. The first end 31 of the first seal 30 is abutted against the first face portion 22 of the first cap 20, and the first flange 21 is abutted against the first restricting portion 112.

A French type valve a is inserted through the first hole 23 of the first cap 20 and the first through hole 33 of the first seal 30, and the first seal 30 is adapted for air-tightly surrounding and non-threadly engaging with a neck of the French type valve a. Air pumped from the air pump is able to flow through the second hole 43a, the second through hole 53a, the stepped hole 68a, and the aperture 67a into the French type valve a. The second airtight member 123 provides that air cannot leak between the nozzle head 2 and the housing assembly 10.

In view of the forgoing, it is an object of the present invention to provide the air valve connector for an air pump that can be used with valves of various types.

It is another object of the present invention that the air valve connector is alternatively located between the first and second positions to prevent troublesome detachments, assembling errors, and elements easily getting lost when detached.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. An air valve connector for an air pump adapted to connect with different types of air valves, comprising:

a housing assembly including outer and inner peripheries, with the outer periphery including first and second [outer thread] portions respectively arranged at two opposite ends thereof and alternatively engaged with a nozzle head of the air pump, with the air pump including a pivotal and eccentrical cam lever, with the housing assembly selectively mounted to the nozzle head between first and second positions;

a first cap selectively mounted in the inner periphery of the housing assembly and moveable axially with respect to the housing assembly;

a first seal received in the first cap;

a second cap selectively mounted in the inner periphery of the housing assembly and moveable axially with respect to the housing assembly;

a second seal received in the second cap;

a core member received in the inner periphery of the housing assembly and disposed between the first and second seals, with the core member including a guiding portion extending axially from an end thereof;

wherein the housing assembly is located in the first position, with the second [outer thread] portion engaged with the nozzle head of the air pump, with a French type valve adapted for inserting through the first cap and the first seal, with the cam lever compelling the first seal to deform to connect with a neck of the French type valve;

wherein the housing assembly is located in the second position, with the first [outer thread] portion engaged with the nozzle head of the air pump, with an American type valve adapted for inserting through the second cap and the second seal, with the American type valve adapted to be abutted against the guiding portion, with the cam lever compelling the second seal to deform to connect with a neck of the American type valve.

2. The air valve connector as claimed in claim 1, wherein the housing assembly includes first and second sleeves threadly engaged with each other;

*wherein the first and second portions comprise first and second outer thread portions;* wherein the first sleeve includes the first outer thread portion and a first restricting portion, with the first outer thread portion and the first restricting portion respectively disposed at outer and inner surfaces of the first sleeve;

wherein the second sleeve includes the second outer thread portion, a second restricting portion, with the second outer thread portion and the second restricting portion respectively disposed at outer and inner surfaces of the second sleeve; and wherein the first cap includes a first flange abutted against the first restricting portion, and wherein the second cap includes a second flange adapted to abut against the second restricting portion.

3. The air valve connector as claimed in claim 2, wherein the first sleeve includes a holding portion, a first airtight member, and a connecting portion, with the holding portion and the first airtight member disposed at the outer surface of the first sleeve, with the connecting portion disposed at the inner surface of the first sleeve;

wherein the second sleeve includes a second airtight member mounted on an outer periphery of the second outer thread portion engaged with the connecting portion, with the second airtight member abutted against an end face of the holding portion opposite to the first airtight member.

4. The air valve connector as claimed in claim 1, wherein the first cap includes a first face portion abutted against a first end of the first seal and a first hole adapted to be inserted by the French type valve.

5. The air valve connector as claimed in claim 4, wherein the first seal includes a second end disposed opposite to the first end thereof, a first through hole communicated with the first end thereof and adapted to be inserted by the French type valve.

6. The air valve connector as claimed in claim 5, wherein the first seal further includes a chamber disposed between and communicated with the first through hole and the second end, wherein the core member includes a projecting portion extending axially opposite to the guiding portion, with the projecting portion being a stepped shape to form a first resisting face disposed between the projecting portion and an end surface of the core member, with the first resisting face abutted against the second end of the first seal, with the projecting portion being surrounded and received in the chamber tightly.

7. The air valve connector as claimed in claim 1, wherein the second cap includes a second face portion and a second hole adapted to be inserted by the American type valve, wherein the second seal includes first and second ends respectively disposed at two opposite ends thereof, with the first end of the second seal abutted against the second face portion.

8. The air valve connector as claimed in claim 7, wherein the second seal includes a second through hole extended between the first and second ends, with the second through hole being a screw hole adapted to be threadly engaged with the American type valve.

9. The air valve connector as claimed in claim 2, wherein the first seal further includes a chamber, wherein the core member includes a projecting portion extending axially opposite to the guiding portion, with the projecting portion surrounded and received in the chamber tightly.

10. The air valve connector as claimed in claim 9, wherein the first seal includes a second end, wherein the projecting portion is a stepped shape to form a first resisting face disposed between there and an end surface of the core member, with a first shoulder extending axially from the first resisting face, with the guiding portion extending axially from a second resisting face arranged opposite to the first resisting face, with a second shoulder formed between the guiding portion and the second resisting face, wherein the core member further includes an aperture connected to the projecting portion, and a stepped hole communicated with the aperture and connected to the guiding portion therethrough;

wherein the first resisting face faces the first flange to define a first space, wherein the second resisting face faces the second flange to define a second space.

11. An air valve connector for an air pump adapted to connect with different types of air valves, comprising:

a housing assembly including outer and inner peripheries, with the outer periphery including first and second [outer thread] portions respectively arranged at two opposite ends thereof and alternatively engaged with a nozzle head of the air pump pivotally and eccentrically connected with a cam lever between first and second positions;

a first cap selectively mounted in and moveable axially with respect to the housing assembly;

a first seal received in the first cap;

a second cap selectively mounted in and moveable axially with respect to the housing assembly;

a second seal received in the second cap; and a core member received in the housing assembly and disposed between the first and second seals, with the core member including a guiding portion extending axially from an end thereof;

wherein the housing assembly is located in the first position, with the second [outer thread] portion engaged with the nozzle head of the air pump, with a French type valve adapted for inserting through the first cap and the first seal, with the cam lever compelling the first seal to deform to connect with a neck of the French type valve;

wherein the housing assembly is located in the second position, with the first [outer thread] portion engaged with the nozzle head of the air pump, with an American type valve adapted for inserting through the second cap and the second seal, with the American type valve adapted to be abutted against the guiding portion, with the cam lever compelling the second seal to deform to connect with a neck of the American type valve;

wherein the housing assembly includes first and second sleeves [threadly] engaged with each other;

wherein the first sleeve includes the first [outer thread] portion and a first restricting portion, with the first [outer thread] portion and the first restricting portion respectively disposed at outer and inner surfaces of the first sleeve;

wherein the second sleeve includes the second [outer thread] portion[,] *and* a second restricting portion, with the second [outer thread] portion and the second restricting portion respectively disposed at outer and inner surfaces of the second sleeve; and wherein the first cap includes a first flange abutted against the first restricting portion, and wherein the second cap includes a second flange abutted against the second restricting portion.

12. An air valve connector for an air pump adapted to connect with different types of air valves, comprising:

a housing assembly including outer and inner peripheries, with the outer periphery including first and second [outer thread] portions respectively arranged at two opposite ends thereof and alternatively engaged with a nozzle head of the air pump pivotally and eccentrically connected with a cam lever between first and second positions;

a first cap selectively mounted in and moveable axially with respect to the housing assembly;

a first seal received in the first cap;

a second cap selectively mounted in and moveable axially with respect to the housing assembly;

a second seal received in the second cap; and a core member received in the housing assembly and disposed between the first and second seals, with the core member including a guiding portion extending axially from an end thereof;

wherein the housing assembly is located in the first position, with the second [outer thread] portion engaged with the nozzle head of the air pump, with a French type valve adapted for inserting through the first cap and the first seal, with the cam lever compelling the first seal to deform to connect with a neck of the French type valve;

wherein the housing assembly is located in the second position, with the first [outer thread] portion engaged with the nozzle head of the air pump, with an American type valve adapted for inserting through the second cap and the second seal, with the American type valve adapted to be abutted against the guiding portion, with the cam lever compelling the second seal to deform to connect with a neck of the American type valve;

wherein the first cap includes a first face portion abutted against a first end of the first seal and a first hole adapted to be inserted by the French type valve;

wherein the first seal includes a second end disposed opposite to the first end thereof, a first through hole communicated with the first end thereof and adapted to be inserted by the French type valve; and wherein the first seal further includes a chamber disposed between and communicated with the first through hole and the second end, wherein the core member includes a projecting portion extending axially opposite to the guiding portion, with the projecting portion being a stepped shape to form a first resisting face disposed between the projecting portion and an end surface of the core member, with the first resisting face abutted against the second end of the first seal, with the projecting portion being surrounded and received in the chamber tightly.

* * * * *